United States Patent
Kwan et al.

(10) Patent No.: US 7,827,387 B1
(45) Date of Patent: Nov. 2, 2010

(54) COMMUNICATION BUS WITH HIDDEN PRE-FETCH REGISTERS

(75) Inventors: Kevin Kwan, Irvine, CA (US); Michael R. Spaur, Dana Point, CA (US)

(73) Assignee: Marvell International Ltd., Hamilton (BM)

( * ) Notice: Subject to any disclaimer, the term of this patent is extended or adjusted under 35 U.S.C. 154(b) by 992 days.

(21) Appl. No.: 11/517,927

(22) Filed: Sep. 8, 2006

(51) Int. Cl.
*G06F 9/00* (2006.01)

(52) U.S. Cl. .................................................. 712/220

(58) Field of Classification Search .................. 712/220
See application file for complete search history.

(56) References Cited

U.S. PATENT DOCUMENTS 6,738,867 B1 * 5/2004 Kanai ........................ 711/137

* cited by examiner

*Primary Examiner*—Alford W Kindred
*Assistant Examiner*—Benjamin P Geib

(57) ABSTRACT

A system-on-chip (SOC) includes a processor, a controller module for a hard disk drive, and a communication bus that provides a communication link between the processor and the controller module. The communication bus includes a multiplexer that includes an output and an input that receives data from a selected one of N registers associated with the controller module and propagates the data to the output, M address registers that store addresses of up to M ones of the N registers, M data registers that receive pre-fetch data that corresponds to the data from the output from the M ones of the N registers, and a second multiplexer that includes a second output and that reads the pre-fetch data from the M data registers and propagates the pre-fetch data to the second output. M and N are positive integers greater than two and N is greater than M.

22 Claims, 8 Drawing Sheets

COMMUNICATION BUS WITH HIDDEN PRE-FETCH REGISTERS

FIELD

The present disclosure relates to reading register data in a digital system.

BACKGROUND

In computer systems it is generally desirable to read and write data as quickly as possible. While advances have been made in access speeds of memory such as RAM and ROM, there remains a need in the art to accelerate read cycles from peripheral devices such as hard disk drives.

Referring now to FIG. 1, a communication bus 10 is shown for a hard disk drive controller (not shown). Communication bus 10 provides a communication link between a processor 12 and data registers 14-0 through 14-N, collectively referred to as data registers 14. Each of data registers 14 can be associated with a different module of the hard disk controller. For example, data register 14-0 can be associated with a servo control module that positions a read-write head of a hard disk drive. Data register 14-1 can be associated with a diagnostic module of the hard disk drive, and so forth.

Processor 12 executes multiple steps to read data from one of data registers 14. For example, processor 12 first designates the module that is associated with the selected data register 14 that will be read. Processor 12 then specifies an address or address offset of the selected data register 14. A snapshot register module 16 captures the data from selected data register 14. Processor 12 can then read the data from snapshot register module 16 via a multiplexer 18. This process can take several clock cycles and may prevent processor 12 from attending to other tasks while it is reading from the selected one of data registers 14.

SUMMARY

A system-on-chip (SOC) includes a processor, a controller module for a hard disk drive, and a communication bus that provides a communication link between the processor and the controller module. The communication bus includes a first multiplexer that includes a first output and a first input that receives data from a selected one of N registers associated with the controller module and propagates the data to the first output, M address registers that store addresses of up to M ones of the N registers, M data registers that receive pre-fetch data that corresponds to the data from the first output from the M ones of the N registers, and a second multiplexer that includes a second output and that reads the pre-fetch data from the M data registers and propagates the pre-fetch data to the second output. M and N are positive integers greater than two and N is greater than M.

In other features the addresses of the selected ones of the N registers are stored in the M address registers in an arbitrary order. The SOC further includes a third multiplexer that includes a third output and a third input that receives data from the first output and the pre-fetch data from the second output. The SOC further includes an input that receives a read signal from the processor. The read signal is asserted while the processor reads the pre-fetch data from the third output. The second multiplexer receives the pre-fetch data while the read signal is relinquished.

In other features the controller module includes K modules. Each of the K modules is associated with at least one of the N registers. K is an integer greater than or equal to two. One of the K modules is a timing module that generates timing data based on servo data associated with the disk drive. The timing module stores the timing data in at least one of the N registers. At least one of the K modules is a read channel interface module that receives the servo data from the disk drive and that stores the servo data in at least one of the N registers. The SOC also includes a periodic clock signal. The pre-fetch data can be read from the second output once every clock period.

A method of operating a system-on-chip (SOC) includes storing M addresses of N registers that are associated with a hard disk control module of the SOC and that communicate data to an output, pre-fetching the data from the N registers corresponding to the M addresses into M data registers, and reading the pre-fetched data from the M data registers via the output. M and N are positive integers greater than two and N is greater than M.

In other features the method includes storing the M addresses in an arbitrary order in M address registers. The method includes multiplexing the output between the data from the N registers and the pre-fetched data from the M data registers. The method includes receiving a read signal from a processor. The read signal is asserted while the processor reads the pre-fetch data from the output and the pre-fetching step occurs while the read signal is relinquished.

In other features the method includes associating at least K data sources with at least one of the N registers. K is an integer greater than or equal to two. One of the K modules is a timing module that generates timing data based on servo data associated with a disk drive. The method includes storing the timing data in at least one of the N registers. The method includes receiving servo data associated with the disk drive and storing the servo data in at least one of the N registers. The method includes generating a periodic clock signal. The pre-fetched data from the pre-fetching step can be read from the output once every clock period.

A system-on-chip (SOC) includes processor means for reading data, controller means for controlling at least a portion of a hard disk drive, and communication means for providing a communication link between the processor means and the controller means. The communication means includes first multiplexer means for receiving data from a selected one of N registers associated with the controller means and propagating the data to a first output of the first multiplexer means, M address register means for storing addresses of up to M ones of the N registers, M data register means for receiving pre-fetch data that corresponds to the data from the first output from the M ones of the N registers, and second multiplexer means for reading the pre-fetch data from the M data register means and propagating the pre-fetch data to a second output associated with the second multiplexer means. M and N are positive integers greater than two and N is greater than M.

In other features the addresses of the selected ones of the N registers are stored in the M address register means in an arbitrary order. The SOC includes third multiplexing means for reading data from the first output and the pre-fetch data from the second output. The SOC includes input means for receiving a read signal from the processor. The read signal is asserted while the processor reads the pre-fetch data from the third multiplexing means and wherein the second multiplexing means reads the pre-fetch data while the read signal is relinquished.

In other features the controller means includes K means for generating data. Each of the K means includes at least one of the N registers. K is an integer greater than or equal to two. One of the K means is a timing means for generating timing data based on servo data associated with the disk drive. The timing means stores the timing data in at least one of the N registers. At least one of the K means is a read channel interface means for receiving the servo data from the disk drive and storing the servo data in at least one of the N registers. The SOC includes a periodic clock signal. The pre-fetch data can be read from the second output once every clock period.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
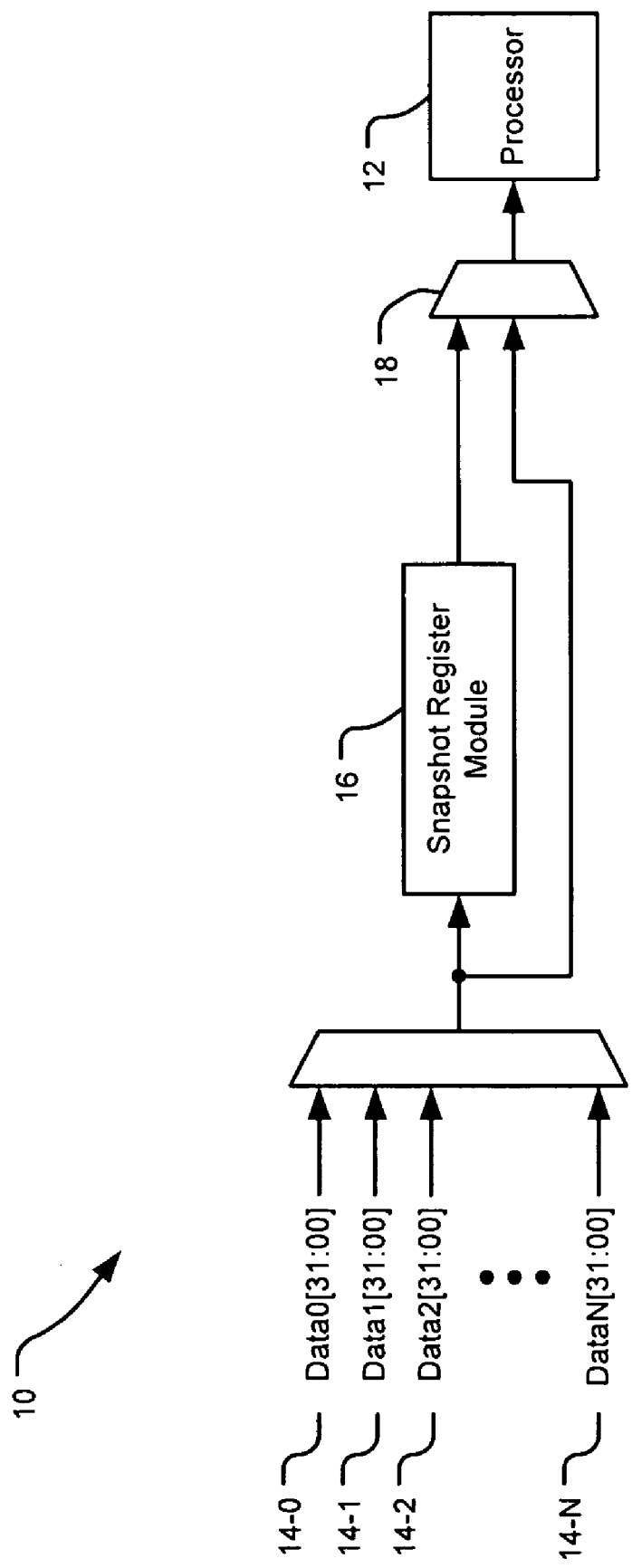
FIG. 1 is a functional block diagram of a communication bus according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
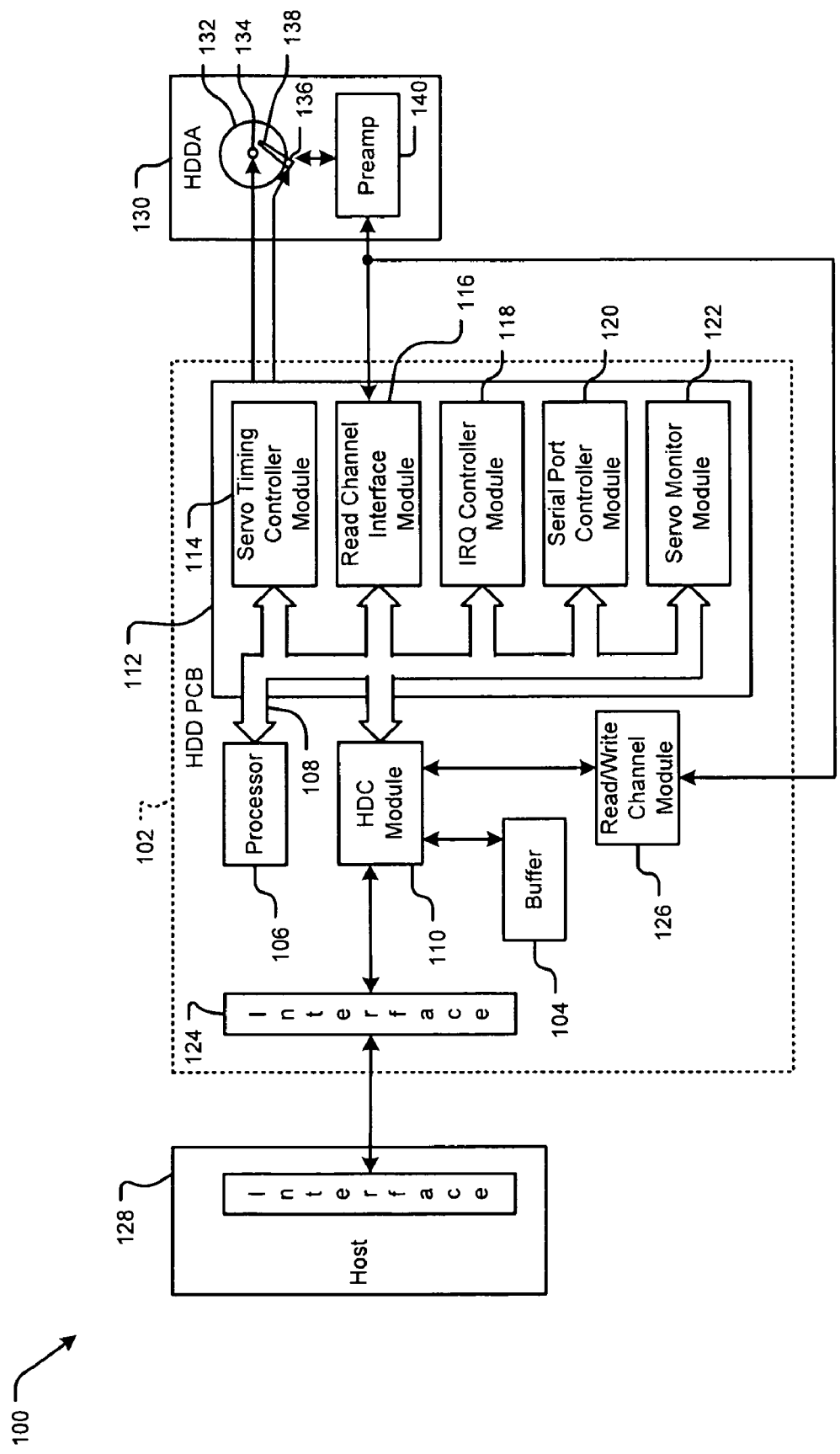
FIG. 2 is a functional block diagram of a hard disk drive (HDD) system according to the present disclosure.

Referring now to FIG. 2, an exemplary hard disk drive (HDD) system 100 is shown. HDD system 100 implements hidden pre-fetch cycles. The hidden pre-fetch cycles, which are described below, decrease the number of clock cycles needed to read data from predetermined data registers and can be used to increase the data throughput of HDD system 100.

HDD system 100 can include a HDD printed circuit board (PCB) 102. A memory module, such as buffer 104, stores read, write and/or volatile control data that is associated with the control of HDD system 100. Buffer 104 usually employs volatile memory having low latency. For example, SDRAM, double data rate (DDR), or other types of low latency memory may be used. Nonvolatile memory such as flash memory may also be provided to store critical data such as nonvolatile control code.

A processor 106 can be arranged on HDD PCB 102. Processor 106 performs data and/or control processing that is related to the operation of HDD system 100. Processor 106 communicates with a communication bus 108. Communication bus 108 provides a communication path between processor 106, a hard disk control (HDC) module 110, and a spindle/voice coil motor (VCM) driver or module 112. Spindle/VCM module 112 can include a servo timing controller module 114, a read channel interface module 116, an interrupt request (IRQ) controller module 118, a serial port controller module 120 and a servo monitor module 122, all of which may communicate with communication bus 108. HDC module 110 communicates with an input/output interface 124. HDC module 110 coordinates control of spindle/VCM module 112, a read/write channel module 126, processor 106 and data input/output with a host 128 via interface 124.

A hard disk drive assembly (HDDA) 130 includes one or more hard drive platters 132 that include magnetic coatings that store magnetic fields. Platters 132 are rotated by a spindle motor that is schematically shown at 134. Generally spindle motor 134 rotates hard drive platters 132 at a controlled speed during the read/write operations. One or more read/write arms 136 move relative to platters 132 to read and/or write data to/from hard drive platters 132. Spindle/VCM module 112 controls spindle motor 134, which rotates platters 132. Spindle/VCM module 112 also generates control signals that position read/write arms 136, for example using a voice coil actuator, a stepper motor or any other suitable actuator.

Platters 132 include servo data that is recorded at predetermined locations on platters 132. Spindle/VCM module 112 uses the servo data to provide closed loop control of the position of arms 136 with respect to platters 132. Read channel interface module 116 receives the servo data and communicates it onto communication bus 108. Servo timing controller module 114 can use the servo data to provide timing for servo events, such as positioning arms 136. IRQ controller module 118 generates interrupts based on events in servo timing controller module 114 and/or read channel interface module 116. Serial port controller module 120 arbitrates and controls the communications of servo timing controller module 114 and processor 106. Servo monitor module 122 performs debugging and/or testing of spindle/VCM module 112.

During write operations, read/write channel module 126 encodes the data to be written with a read/write device 138. Read/write channel module 126 processes the write signal for reliability and may apply, for example, error correction coding (ECC), run length limited coding (RLL), and the like. During read operations, read/write channel module 126 converts an analog read signal output of read/write device 138 to a digital read signal. The converted signal is then detected and decoded by known techniques to recover the data that was written on platters 132.

Read/write device 138 is located near a distal end of read/write arms 136. Read/write device 138 includes a write element such as an inductor that generates a magnetic field. Read/write device 138 also includes a read element, such as a magneto-resistive (MR) element, that senses the magnetic field on platters 132. HDDA 130 includes a preamplifier circuit or module 140 that amplifies the analog read/write signals. When reading data, preamplifier module 140 amplifies low level signals from the read element and outputs the amplified signal to read/write channel module 126. While writing data, a write current is generated that flows through the write element of read/write device 138. The write current is switched to produce a magnetic field having a positive or negative polarity. The positive or negative polarity is stored by hard drive platters 132 and is used to represent data.

The data is stored on platters 132 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, processor 106 and HDC module 110 may be implemented by a single chip. Spindle/VCM module 112 and/or read/write channel module 126 may also be implemented by the same chip as processor 106, HDC module 110 and/or by additional chips. Alternatively, most of HDD system 100 other than HDDA 130 may be implemented as a system on chip (SOC).

Figure 3:
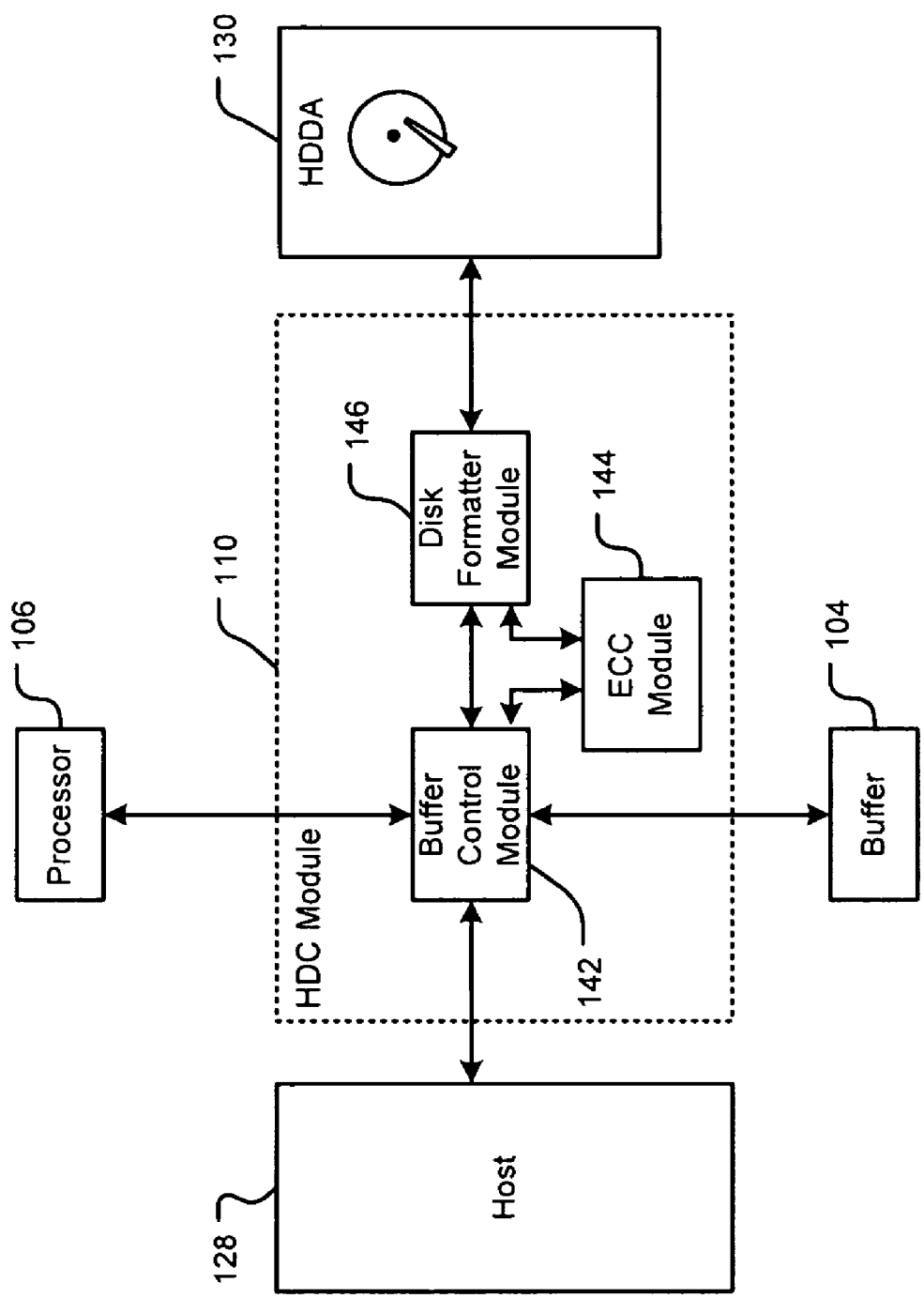
FIG. 3 is a functional block diagram of a hard disk control (HDC) module according to the present disclosure.

Referring now to FIG. 3, HDC module 110 is shown in more detail. HDC module 110 may include a digital signal processor (DSP) and/or other processor that reads data from spindle/VCM module 112. HDC module 110 communicates with buffer 104, processor 106, host 128, and HDDA 130 as described in FIG. 2. HDC module 110 includes a buffer control module 142, an ECC module 144, and a disk formatter module 146.

Buffer control module 142 (e.g. a direct memory access (DMA) controller) connects buffer 104 to disk formatter module 146, ECC module 144, host 128, processor 106, and HDDA 130. Buffer control module 142 regulates data movement in and out of buffer 104.

Host 128 sends read and write commands to HDC module 110. HDC module 110 stores the read and write commands in buffer 104. Processor 106 receives the read and write commands from buffer 104 and executes firmware to control HDC module 110 accordingly. During read operations, HDC module 110 reads data corresponding to the read commands from HDDA 130. Buffer control module 142 and ECC module 144 receive the data from HDDA 130. ECC module 144 provides an ECC mask for errors that may have occurred during read operations while the data is still in buffer control module 142. After any errors in the data are corrected, the data is transferred to buffer 104. The data is then transferred from buffer 104 to host 128.

During write operations, disk formatter module 146 controls writing of data to HDDA 130. Buffer 104 receives data corresponding to the write commands via HDC module 110. Disk formatter module 146 receives the data from buffer 104 via HDC module 110. Disk formatter module 146 formats the data for writing to HDDA 130. For example, disk formatter module 146 adds error correction codes to the data, monitors a position of the read/write elements, and writes the data to the read/write elements as described in FIG. 2.

Figure 4:
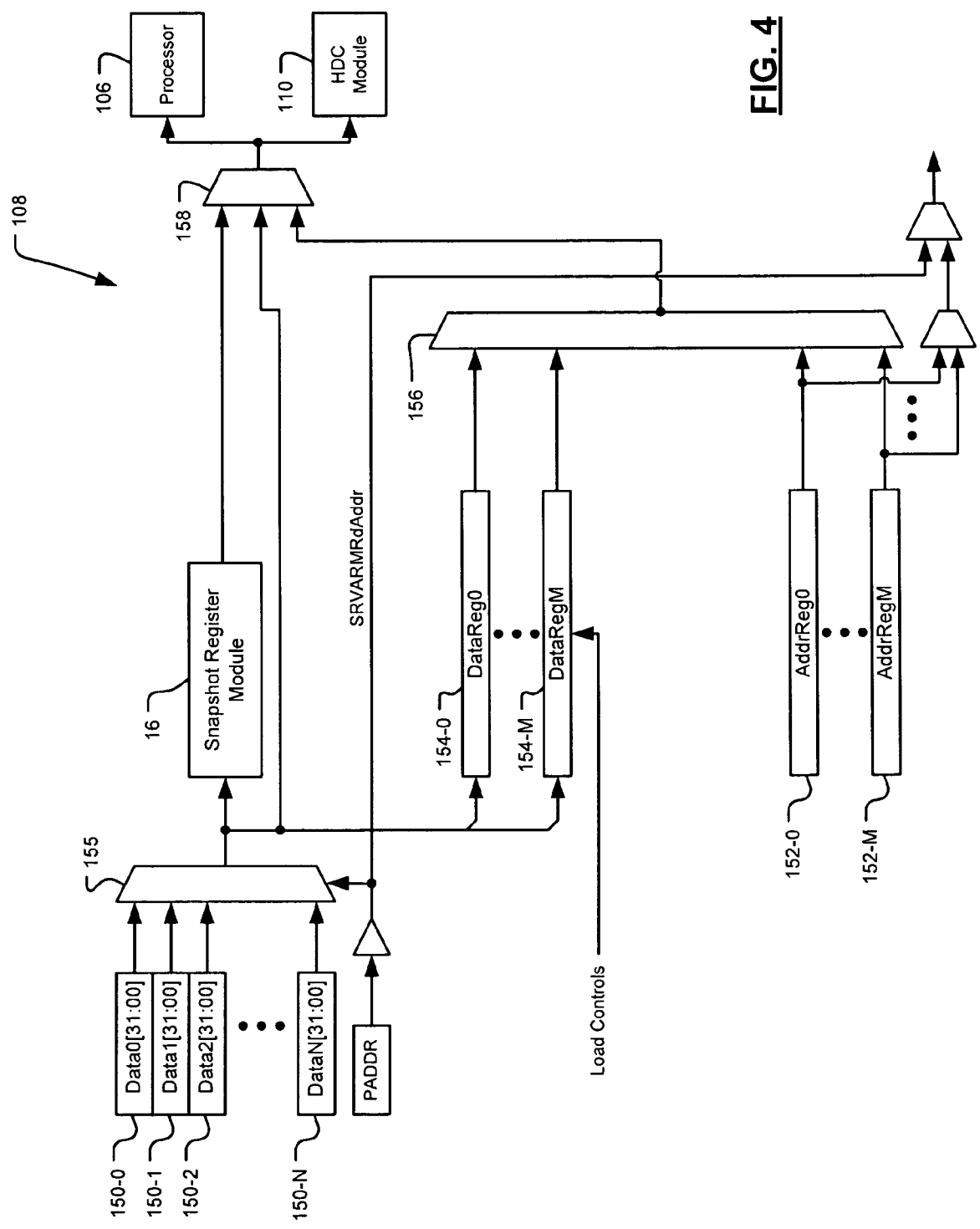
FIG. 4 is a functional block diagram of an interface bus according to the present disclosure.

Referring now to FIG. 4, communication bus 108 is shown in more detail. Data registers 150-0 through 150-N represent various data registers associated with servo timing controller module 114, read channel interface module 116, IRQ controller module 118, serial port controller module 120, and/or servo monitor module 122. Communication bus 108 uses the hidden pre-fetch cycles to decrease the amount of time that it takes processor 106 and/or HDC module 110 to read data from selected ones of data registers 150. The hidden pre-fetch cycles allow processor 106 and/or HDC module 110 to select M of the N data registers 150 which hold data that needs to be read quickly, e.g. quicker than data read from the remaining N-M data registers 150. Once processor 106 and/or HDC module 110 select the M of N data registers 150, communication bus 108 periodically copies the data from the M selected data registers 150 to other registers that can be read quickly by processor 106 and/or HDC module 110. Communication bus 108 performs the periodic copying process without further interaction from processor 106 and/or HDC module 110.

The following description of the hidden pre-fetch cycles assumes HDC module 110 is selecting and reading the data from the M data registers 150, however it should be appreciated that processor 106 can be substituted for, or operate in conjunction with, HDC module 110.

HDC module 110 first writes the address of a selected one of data registers 150 to one of address registers 152-0 through 152-M, collectively referred to as address registers 152. HDC module 110 repeats this process for each of the M data registers 150 that it needs to read from quickly. After HDC module 110 writes the addresses to address registers 152, a first multiplexer 155 periodically copies data from data registers 150 that are pointed to by the addresses written in address registers 152. Multiplexer 155 then writes the copied data to corresponding ones of data registers 154-0 through 154-M without any more interaction from HDC module 110. HDC module 110 can then read the data from data registers 154 via a second multiplexer 156 and a third multiplexer 158 without again needing to specify the modules and addresses of data registers 150. Since communication bus 108 pre-fetches the data from data registers 150 into data registers 154, the read cycle time of HDC module 110 is improved over the prior art when accessing the data in data registers 154.

Figure 5:
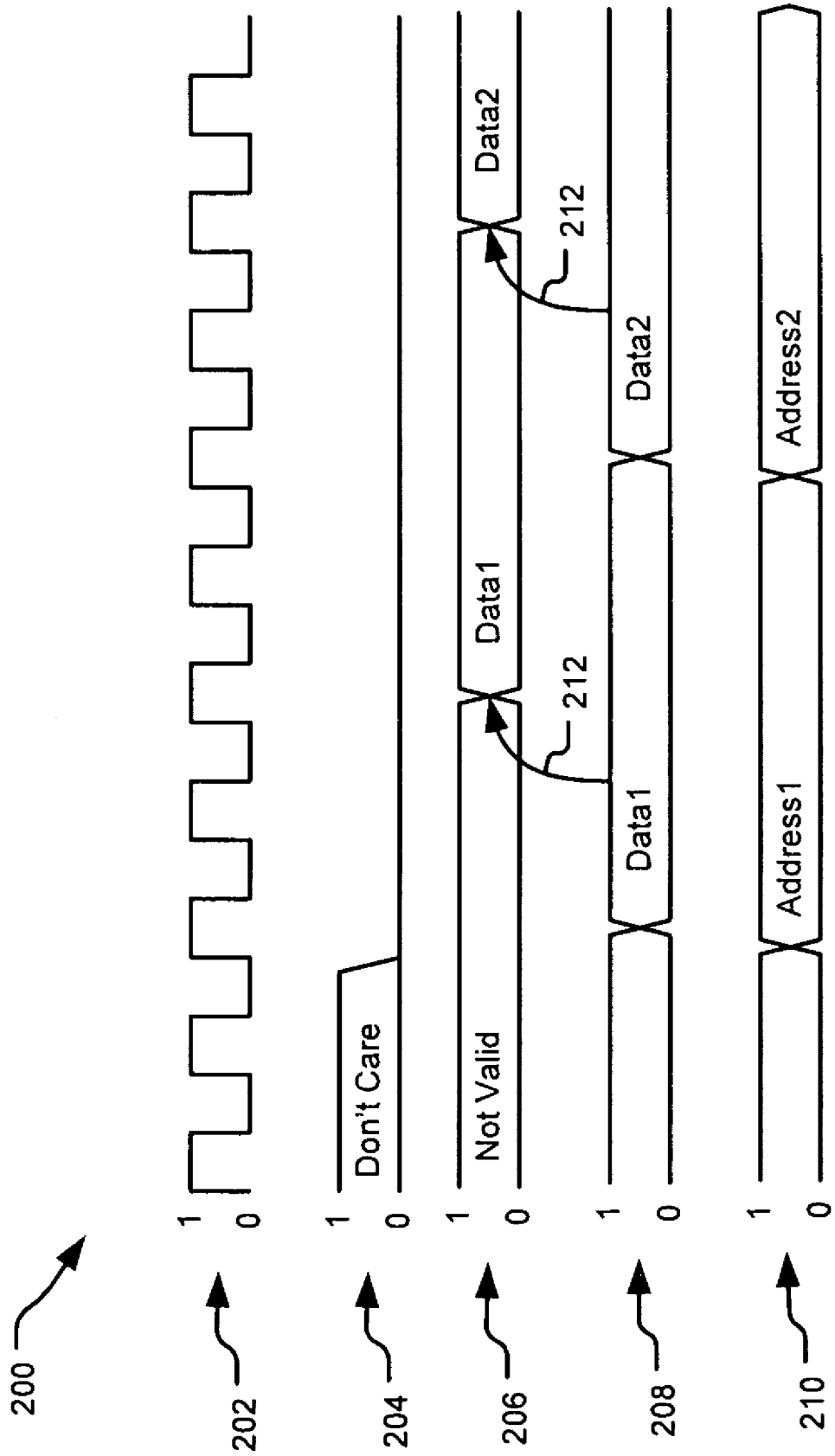
FIG. 5 is a timing diagram of IM bus signals according to the present invention.

Referring now to FIG. 5, a timing diagram 200 shows signals of communication bus 108. A system clock is shown generally at 202. System clock 202 is applied to the various modules of spindle/VCM module 112. A CPU read control signal is shown generally at 204 and is generated by HDC module 110. Data from data registers 154 is shown generally at 206. Data in data registers 150 is shown generally at 208. Addresses of respective ones of data registers 150 are shown generally at 210.

Timing diagram 200 shows that communication bus 108 copies data from data registers 150 into data registers 154 while read control signal 204 is relinquished (e.g. low). When read control signal 204 is relinquished it indicates that HDC module 110 is not reading from the communication bus 108. Pre-fetch cycles are indicated by arrows 212 and are performed by communication bus 108 without further interaction from HDC module 110. The pre-fetch cycles are therefore hidden from HDC module 110.

Figure 6B:
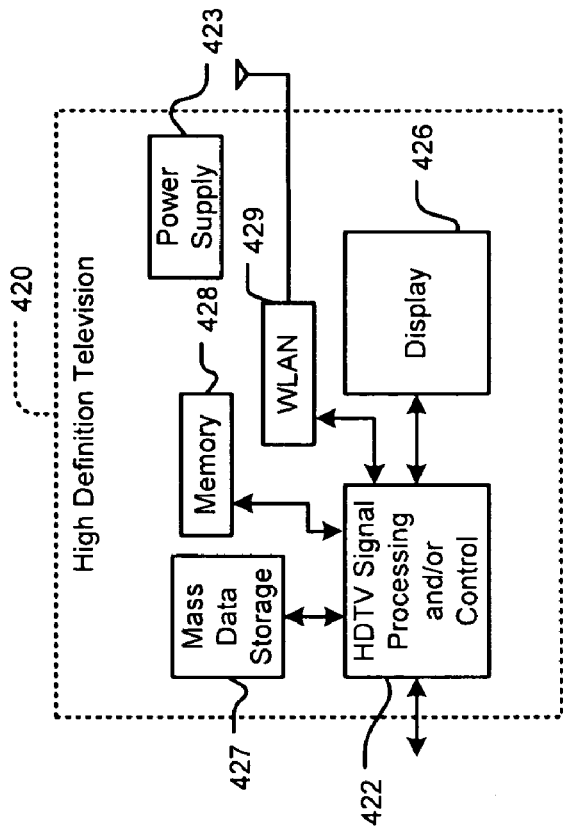
FIG. 6B is a functional block diagram of a high definition television.
Figure 6A:
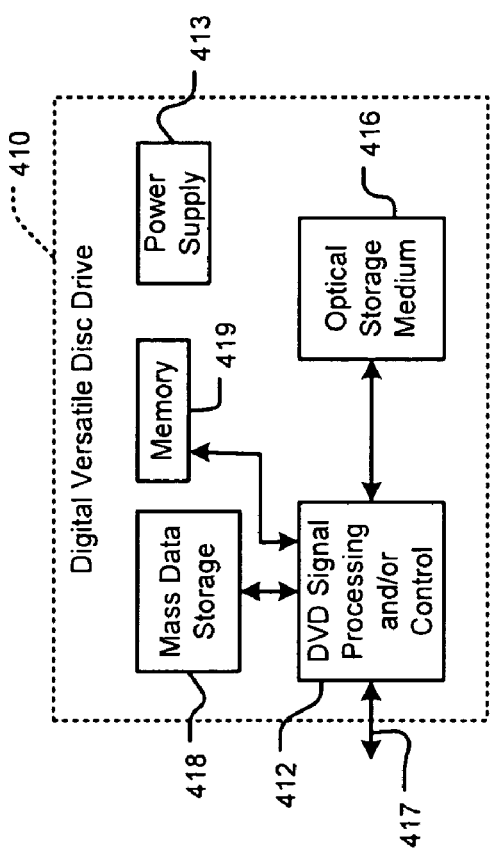
FIG. 6A is a functional block diagram of a digital versatile disk (DVD)

Referring now to FIGS. 6A-6F, various exemplary implementations of communication bus 108 are shown. Referring now to FIG. 6A, a digital versatile disc (DVD) drive 410 is shown. Communication bus 108 may implement and/or be implemented in one or more communications busses that connect to either one or both signal processing and/or control circuit 412 of DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The signal processing and/or control circuit 412 may communicate with mass data storage 418 that stores data in a nonvolatile manner. The mass data storage 418 may include a hard disk drive (HDD). The HDD may have the configuration shown in FIG. 2. The HDD may be a mini HDD that includes one or more platters having a diameter that is smaller than approximately 1.8". The signal processing and/or control circuit 412 may be connected to memory 419 such as RAM, ROM, low latency nonvolatile memory such as flash memory and/or other suitable electronic data storage. The DVD drive 410 may include a power supply 413.

Referring now to FIG. 6B, communication bus 108 can be implemented in one or more communications busses that connect to a signal processing circuit and/or a control circuit 422 of a high definition television (HDTV) 420. The HDTV 420 receives HDTV input signals in either a wired or wireless format and generates HDTV output signals for a display 426. In some implementations, the signal processing circuit and/or control circuit 422 and/or other circuits (not shown) of the HDTV 420 may process data, perform coding and/or encryption, perform calculations, format data and/or perform any other type of HDTV processing that may be required.

The signal processing circuit and/or control circuit 422 may communicate with mass data storage 427 that stores data in a nonvolatile manner such as optical and/or magnetic storage devices including hard disk drives (HDDs) and DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The signal processing circuit and/or control circuit 422 may be connected to memory 428 such as RAM, ROM, low latency nonvolatile memory such as flash memory and/or other suitable electronic data storage. The HDTV 420 also may support connections with a WLAN via a WLAN network interface 429. The HDTV 420 may include a power supply 423.

Figure 6D:
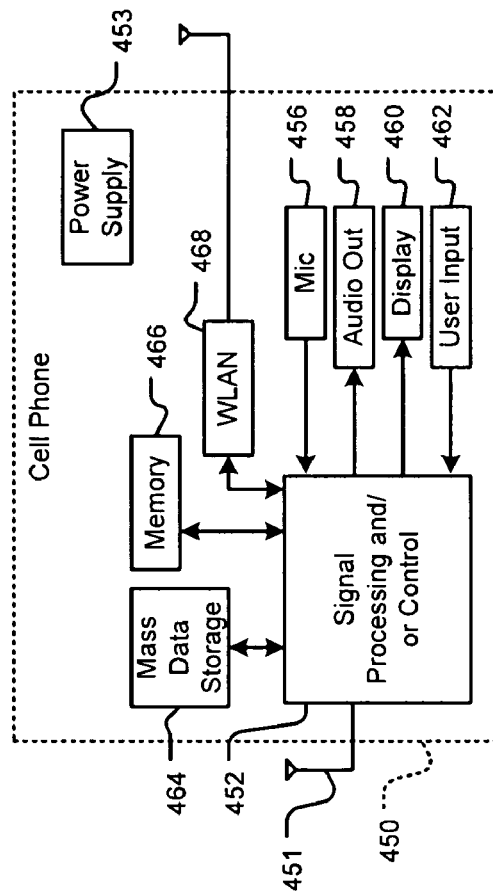
FIG. 6D is a functional block diagram of a cellular phone.
Figure 6C:
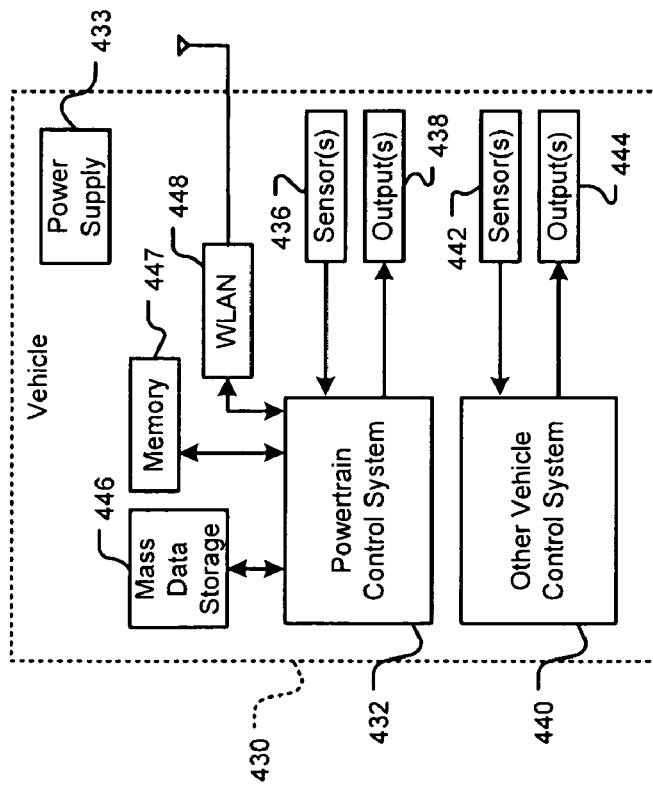
FIG. 6C is a functional block diagram of a vehicle control system.

Referring now to FIG. 6C, communication bus 108 may implement and/or be implemented in one or more communication busses of a control system for vehicle 430. In some implementations communication bus 108 may be implemented in a powertrain control system 432 of the vehicle 430. The powertrain control system 432 receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

Communication bus 108 may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD player, compact disc system and the like. Still other implementations are contemplated.

The powertrain control system 432 may communicate with mass data storage 446 that stores data in a nonvolatile manner. The mass data storage 446 may include optical and/or magnetic storage devices such as hard disk drives (HDDs) and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown). The vehicle 430 may include a power supply 433.

Referring now to FIG. 6D, communication bus 108 can be implemented in a cellular phone 450 that may include a cellular antenna 451. Communication bus 108 may implement and/or be implemented in one or more communications busses that connect to a signal processing and/or a control circuit 452 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuit 452 and/or other circuits (not shown) in the cellular phone 450 may process data, perform coding and/or encryption, perform calculations, format data and/or perform other cellular phone functions.

The signal processing and/or a control circuit 452 may communicate with mass data storage 464 that stores data in a nonvolatile manner such as optical and/or magnetic storage devices including hard disk drives (HDDs) and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The signal processing and/or a control circuit 452 also may connect to a WLAN via a WLAN network interface 468. The cellular phone 450 may include a power supply 453.

Figure 6E:
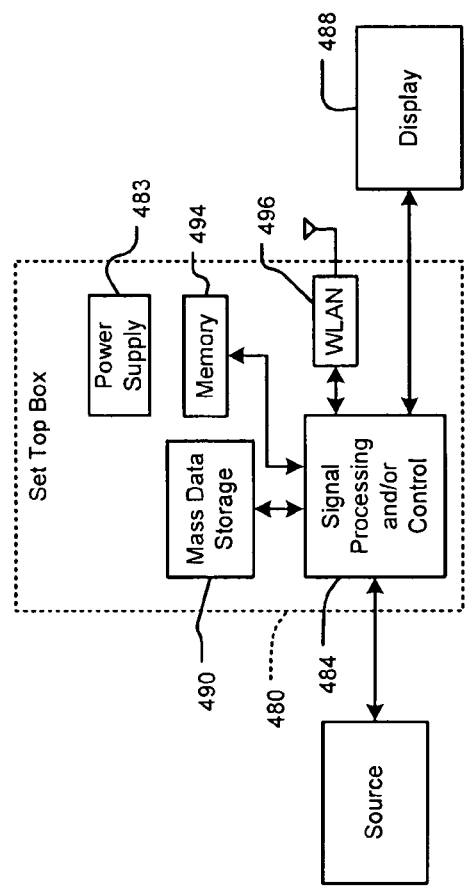
FIG. 6E is a functional block diagram of a set top box.

Referring now to FIG. 6E, communication bus 108 can be implemented in a set top box 480. Communication bus 108 may implement and/or be implemented in one or more communications busses that connect to signal processing and/or control circuit 484 of the set top box 480. The set top box 480 receives signals from a source such as a broadband source and outputs standard and/or high definition audio/video signals suitable for a display 488 such as a television, monitor and/or other video and/or audio output devices. The signal processing and/or control circuit 484 and/or other circuits (not shown) of the set top box 480 may process data, perform coding and/or encryption, perform calculations, format data and/or perform any other set top box function.

The signal processing and/or control circuit 484 may communicate with mass data storage 490 that stores data in a nonvolatile manner. The mass data storage 490 may include optical and/or magnetic storage devices such as hard disk drives (HDDs) and/or DVD drives. At least one HDD may have the configuration shown in FIG. 2 and/or at least one DVD drive may have the configuration shown in FIG. 6A.

The HDD may be a mini HDD that includes one or more platters having a diameter that is smaller than approximately 1.8". The signal processing and/or control circuit 484 may be connected to memory 494 such as RAM, ROM, low latency nonvolatile memory such as flash memory and/or other suitable electronic data storage. The signal processing and/or control circuit 484 also may connect with a WLAN via a WLAN network interface 496. The set top box 480 may include a power supply 483.

Figure 6F:
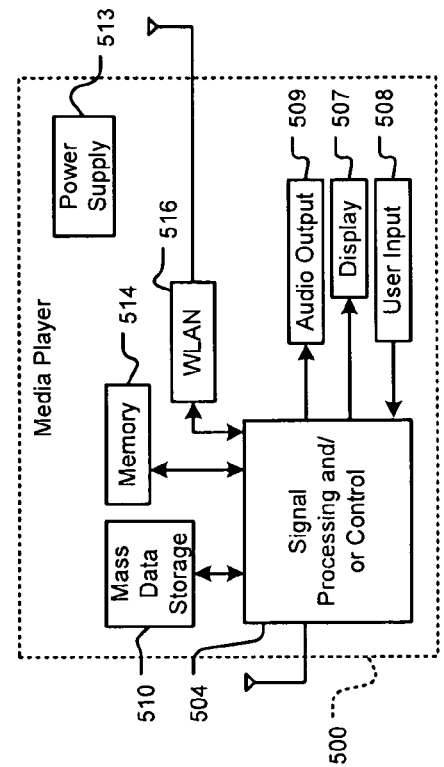
FIG. 6F is a functional block diagram of a media player.

Referring now to FIG. 6F, communication bus 108 can be implemented in one or more communications busses that connect to a signal processing and/or control circuit 504 of a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuit 504 and/or other circuits (not shown) of the media player 500 may process data, perform coding and/or encryption, perform calculations, format data and/or perform any other media player function.

The signal processing and/or control circuit 504 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices such as hard disk drives (HDDs) and/or DVD drives. At least one HDD may have the configuration shown in FIG. 2 and/or at least one DVD may have the configuration shown in FIG. 6A. The HDD may be a mini HDD that includes one or more platters having a diameter that is smaller than approximately 1.8". The signal processing and/or control circuit 504 may be connected to memory 514 such as RAM, ROM, low latency nonvolatile memory such as flash memory and/or other suitable electronic data storage. The signal processing and/or control circuit 504 also may connect with a WLAN via a WLAN network interface 516. The media player 500 may include a power supply 503. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system-on-chip (SOC) comprising:
    a processor;
    a controller module for a hard disk drive; and
    a communication bus that provides a communication link between the processor and the controller module, wherein the communication bus comprises:
        a first multiplexer that:
            includes a first output and a first input,
            receives data from a selected one of N registers associated with the controller module, and
            propagates the data to the first output;
        M address registers that store addresses of up to M ones of the N registers;
        M data registers that periodically receive pre-fetch data that corresponds to the data from the first output from the M ones, respectively, of the N registers; and
        a second multiplexer that:
            includes a second output connected to the processor,
            selectively propagates the data from the N registers to the second output for reading by the processor, and
            selectively propagates the pre-fetch data from the M data registers to the second output for reading by the processor,
        wherein M and N are positive integers greater than two and N is greater than M, and
        wherein the M data registers disable receiving the pre-fetch data when the processor is reading the data from the N registers.

2. The SOC of claim 1 wherein the addresses of the ones of the N registers are stored in the M address registers in an arbitrary order.

3. The SOC of claim 1 wherein:
    the processor asserts a read signal when reading the data from the N registers,
    the M data registers receive the pre-fetch data only while the read signal is relinquished.

4. The SOC of claim 1 wherein the controller module comprises K modules, wherein each of the K modules is associated with at least one of the N registers and wherein K is an integer greater than or equal to two.

5. The SOC of claim 4 wherein one of the K modules is a timing module that generates timing data based on servo data associated with the hard disk drive and wherein the timing module stores the timing data in at least one of the N registers.

6. The SOC of claim 5 wherein at least one of the K modules is a read channel interface module that receives the servo data from the hard disk drive and that stores the servo data in at least one of the N registers.

7. The SOC of claim 1 further comprising a periodic clock signal, wherein the pre-fetch data can be read from the second output once every period of the periodic clock signal.

8. A method of operating a system-on-chip (SOC), comprising:
    storing M addresses of selected ones of N registers that are associated with a control module of the SOC,
    selectively using a bus to read data from the N registers;
    when the bus is idle, pre-fetching data from the selected ones of the N registers, as specified by the M addresses into M data registers, respectively
    periodically repeating the pre-fetching when the bus is idle; and
    reading the pre-fetched data from the M data registers,
    wherein M and N are positive integers greater than two and N is greater than M.

9. The method of claim 8 further comprising storing the M addresses in an arbitrary order in M address registers.

10. The method of claim 8 further comprising multiplexing between the data from the N registers and the pre-fetched data from the M data registers.

11. The method of claim 8 further comprising:
    receiving a read signal from a processor, wherein:
    the read signal is asserted while the processor uses the bus to read data from the N registers, and
    the bus is determined to be idle when the read signal is relinquished.

12. The method of claim 8 further comprising associating at least K data sources with at least one of the N registers, wherein K is an integer greater than or equal to two.

13. The method of claim 12 wherein one of the K data sources is a timing module that:

generates timing data based on servo data associated with a disk drive, and stores the timing data in at least one of the N registers.

14. The method of claim 13 further comprising receiving servo data associated with the disk drive and storing the servo data in at least one of the N registers.

15. The method of claim 8 further comprising generating a periodic clock signal, wherein the pre-fetched data can be read once every period of the periodic clock signal.

16. A system-on-chip (SOC) comprising:

processor means for reading data;

controller means for controlling at least a portion of a hard disk drive; and communication means for providing a communication link between the processor means and the controller means, wherein the communication means comprises:

first multiplexer means for:

receiving data from a selected one of N registers associated with the controller means and propagating the data to a first output of the first multiplexer means;

M address register means for storing addresses of up to M ones of the N registers;

M data register means for periodically receiving pre-fetch data that corresponds to the data from the first output from the M ones, respectively, of the N registers; and second multiplexer means for:

selectively propagating the pre-fetch data from the M data register means to the processor means and selectively propagating the data from the N registers to the processor means via a second output, wherein M and N are positive integers greater than two and N is greater than M, and wherein the M data register means disable receiving the pre-fetch data when the processor means is reading the data from the N registers.

17. The SOC of claim 16 wherein the addresses of the M ones of the N registers are stored in the M address register means in an arbitrary order.

18. The SOC of claim 16 wherein:

the processor means asserts a read signal while the processor means reads the data from the N registers, and the M data register means receive the pre-fetch data only while the read signal is relinquished.

19. The SOC of claim 16 wherein the controller means includes K means for generating data and wherein each of the K means includes at least one of the N registers and wherein K is an integer greater than or equal to two.

20. The SOC of claim 19 wherein one of the K means is a timing means for generating timing data based on servo data associated with the hard disk drive and wherein the timing means stores the timing data in at least one of the N registers.

21. The SOC of claim 20 wherein at least one of the K means is a read channel interface means for receiving the servo data from the hard disk drive and storing the servo data in at least one of the N registers.

22. The SOC of claim 16 further comprising a periodic clock signal, wherein the pre-fetch data can be read from the second output once every period of the periodic clock signal.

* * * * *